United States Patent [19]

Okuyama et al.

[11] Patent Number: 5,701,061
[45] Date of Patent: Dec. 23, 1997

[54] CATHODE-RAY TUBE APPARATUS AND YOKE

[75] Inventors: Nobutaka Okuyama; Soichi Sakurai; Kouji Kitou; Hiroki Oguro, all of Yokohama; Isao Yoshimi, Mobara; Masao Obara, Yokohama; Michitaka Ohsawa, Fujisawa; Kouji Fukuma, Yokohama; Kazuo Majima; Yoshio Yoshiwara, both of Mobara; Minoru Furuya, Esashi, all of Japan

[73] Assignees: Hitachi, Ltd., Tokyo; Hitachi Mizusawa, Iwate-ken, both of Japan

[21] Appl. No.: 460,110

[22] Filed: Jun. 2, 1995

Related U.S. Application Data

[63] Continuation of Ser. No. 26,757, Mar. 5, 1993, Pat. No. 5,475,287.

[30] Foreign Application Priority Data

| May 8, 1992 | [JP] | Japan | 4-115895 |
| Aug. 7, 1992 | [JP] | Japan | 4-211209 |

[51] Int. Cl.$^6$ ............ G09G 1/04; H01J 29/06; H01J 1/52
[52] U.S. Cl. ............ 315/370; 315/8; 315/85; 348/819
[58] Field of Search ............ 315/8, 85, 370; 348/818, 819, 820; 361/150; 313/479

[56] References Cited

U.S. PATENT DOCUMENTS

| 5,151,635 | 9/1992 | Cappels | 315/370 |
| 5,198,729 | 3/1993 | Powell | 315/370 |
| 5,218,270 | 6/1993 | Haapakoski | 315/85 |
| 5,231,332 | 7/1993 | Beaumont et al. | 315/85 |
| 5,243,262 | 9/1993 | Moen | 315/370 |
| 5,260,626 | 11/1993 | Takase et al. | 315/85 |
| 5,357,166 | 10/1994 | Sugahara et al. | 313/479 |

FOREIGN PATENT DOCUMENTS

| 30498589 | 8/1992 | European Pat. Off. |
| 5283020 | 10/1993 | Japan. |
| WO9310537 | 5/1993 | WIPO. |

OTHER PUBLICATIONS

Cancellation of ELF/VLF Electric Fields form CRt Displays, R.D. Cappels, Apple Computer, Inc., Santa Clara, CA., SID 92 Digest, pp. 137–140.

Primary Examiner—Gregory C. Issing
Attorney, Agent, or Firm—Antonelli, Terry, Stout & Kraus, LLP

[57] ABSTRACT

A cathode-ray tube apparatus capable of reducing a high frequency electric field radiated from the deflection yoke and the deflection and high voltage circuit to the outside of the cathode-ray tube apparatus. Mounted on the deflection yoke or on the cathode-ray tube are an induction coil for generating a pulse voltage opposite in polarity to a high pulse voltage applied to the h and an electric field cancellation electrode made of a conductive wire to which the opposite polarity pulse voltage is applied. When the opposite polarity pulse voltage is applied to the electric field cancellation electrode, the electric field cancellation electrode radiates an electric field opposite in polarity to the high frequency electric field radiated from the deflection yoke to the outside of the cathode-ray tube apparatus to reduce the intensity of the high frequency electric field.

1 Claim, 18 Drawing Sheets

CATHODE-RAY TUBE APPARATUS AND YOKE

This application is a continuation of application Ser. No. 08/026,757, filed Mar. 5, 1993 and now U.S. Pat. No. 5,475,287.

BACKGROUND OF THE INVENTION

1. Field of the Invention

The present invention relates to a cathode-ray tube apparatus having a cathode-ray tube and a deflection yoke, and more particularly to a cathode-ray tube apparatus and its yoke capable of suppressing a high frequency electric field radiated from the deflection yoke and a deflection and high voltage circuit to the outside of the apparatus.

2. Description of the Related Art

As a first conventional related art, there is known a cathode-ray tube apparatus described in JP-A-61-138433 wherein a non-magnetic conductive shield member of a ring shape covers the focusing electrode system having an electron gun sealed within the neck portion of the cathode-ray tube and magnetic cores of the deflection yoke.

As a second conventional related art, there is known a cathode-ray tube apparatus disclosed in JP-A-62-241242 wherein a saddle-shaped horizontal deflection coil on a deflection yoke core is connected to a cancellation toroidal coil mounted on the yoke core, to generate a magnetic field opposite in polarity to the horizontal deflection magnetic field leaked from the horizontal deflection coil outside of the deflection yoke assembly. This apparatus aims at canceling the leakage magnetic field and is not intended to cancel and reduce an electric field.

A sawtooth waveform current of a horizontal deflection period is required to flow in the horizontal deflection coil on the deflection yoke. A high pulse voltage is therefore applied to the horizontal deflection coil. A high frequency electric field is generated by this pulse voltage and radiated from the deflection yoke to the outside of the apparatus. With a conventional technique, a pulse voltage opposite in polarity to that applied to the horizontal deflection coil is generated, and the electric field of this pulse voltage is radiated to the outside to reduce the high frequency electric field radiated from the deflection yoke to the outside. As a third conventional related art, there is known a cathode-ray tube apparatus described in SID 92' Digest 1992, pp. 135 to 140 wherein in order to cancel and reduce the high frequency electric field radiated outside of the cathode-ray tube apparatus, a coil for generating a pulse voltage opposite in polarity to the pulse voltage applied to the horizontal deflection coil is coupled to the flyback transformer, and the reverse pulse voltage generated by the coil is applied to an electric field radiator for the cancellation and reduction of the high frequency electric field.

In a general cathode-ray tube apparatus, when the horizontal deflection magnetic field is generated by applying a high pulse voltage to the horizontal deflection coil on the deflection yoke, a high frequency electric field is radiated from the deflection yoke and deflection and high voltage circuit to the outside of the cathode-ray tube apparatus. This high frequency electric field may interfere with other electronic apparatuses near the cathode-ray tube apparatus and may be injurious to users. It is therefore necessary for a cathode-ray tube apparatus to reduce a high frequency electric field radiated to the outside.

However, the first conventional related art aims at preventing the locus of an electron beam from not being influenced by the leakage magnetic field changing in time and radiated from the flyback transformer or the like of the deflection and high voltage circuit, and does not consider the reduction of a high frequency electric field radiated from the deflection yoke and deflection high voltage circuit to the outside of the cathode-ray tube apparatus. Furthermore, since the aperture of the horizontal deflection coil applied with a high pulse voltage is not covered with a shielding member, the high frequency electric field radiated from the deflection yoke to the outside of the cathode-ray tube apparatus can be hardly reduced.

The second conventional related art aims at generating a magnetic field which cancels the leakage magnetic field of the deflection yoke by flowing a current in the cancellation coil, and does not consider the reduction of the high frequency electric field radiated from the deflection yoke and deflection and high voltage circuit to the outside of the cathode-ray tube apparatus.

The third conventional related art provides the flyback transformer having the coil for generating an opposite polarity pulse voltage, without considering the deflection yoke itself which is the main source of radiating the high frequency electric field. Lead wires are therefore necessary for the connection from the coil of the flyback transformer to the electric field radiator mounted on the deflection yoke. It is necessary to mount such an electric field radiator so that it covers the inner surface of the horizontal deflection coil to reduce the electric field generated toward the front surface of the cathode-ray tube. In this case, if a plate type conductive material is used for the electric field radiator, an eddy current will be generated by the horizontal deflection magnetic field, posing a problem of heat generation. To solve this problem, it has been necessary to mount the electric field radiator not directly on the deflection yoke but on other sites near the cathode-ray tube apparatus.

SUMMARY OF THE INVENTION

It is a principal object of the present invention to provide a cathode-ray tube apparatus and its yoke capable of reducing the high frequency electric field radiated from the deflection yoke and deflection high voltage circuit to the outside of the apparatus.

It is another object of the present invention to reduce an eddy current to be generated by a horizontal magnetic field and suppress heat generation by the eddy current.

It is a further object of the present invention to improve the productivity by forming a reverse pulse generation circuit and an electric field cancellation electrode in cooperation with each other.

In order to achieve the above objects, the cathode-ray tube apparatus of the present invention is provided with reverse pulse generating means and an electric field cancellation electrode. In the deflection yoke of the present invention, an induction coil for generating an opposite polarity pulse voltage is provided at the position interlinking the horizontal deflection magnetic field, and an electric field cancellation electrode is provided which is made of a conductive wire or a film conductive wire.

The reverse pulse voltage generating means generates a high pulse voltage applied to the horizontal deflection coil and a pulse voltage opposite in polarity to the high pulse voltage. The electric field cancellation electrode is applied with the pulse voltage generated by the reverse pulse voltage generating means, to generate a corresponding electric field. The applied pulse voltage has an opposite polarity to the high pulse voltage applied to the horizontal deflection coil.

Therefore, the generated electric field has an opposite polarity to the high frequency electric field radiated from the deflection yoke and deflection and high voltage circuit to the outside of the cathode-ray tube apparatus. The generated electric field operates to cancel the high frequency electric field radiated from the deflection yoke and deflection and high voltage circuit to the outside of the cathode-ray tube apparatus, to thereby reduce the high frequency electric field radiated to the outside of the cathode-ray tube apparatus.

Furthermore, the induction coil generates an opposite polarity pulse voltage by interlinking the horizontal deflection magnetic field. This reverse pulse voltage is applied to the electric field cancellation electrode to radiate therefrom the high frequency electric field corresponding to the reverse pulse voltage. In this manner, the high frequency electric field radiated from the horizontal deflection coil can be canceled. Still further, since the electric field cancellation electrode is made of a conductive wire, an eddy current is not likely to generate. If the electric field cancellation electrode or induction coil is made of a film conductive wire, the electrode or coil can be made thin allowing to mount the horizontal deflection coil on the cathode-ray tube as tightly as possible.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Preferred embodiments of the present invention will be described with reference to the accompanying drawings.

Figure 1:
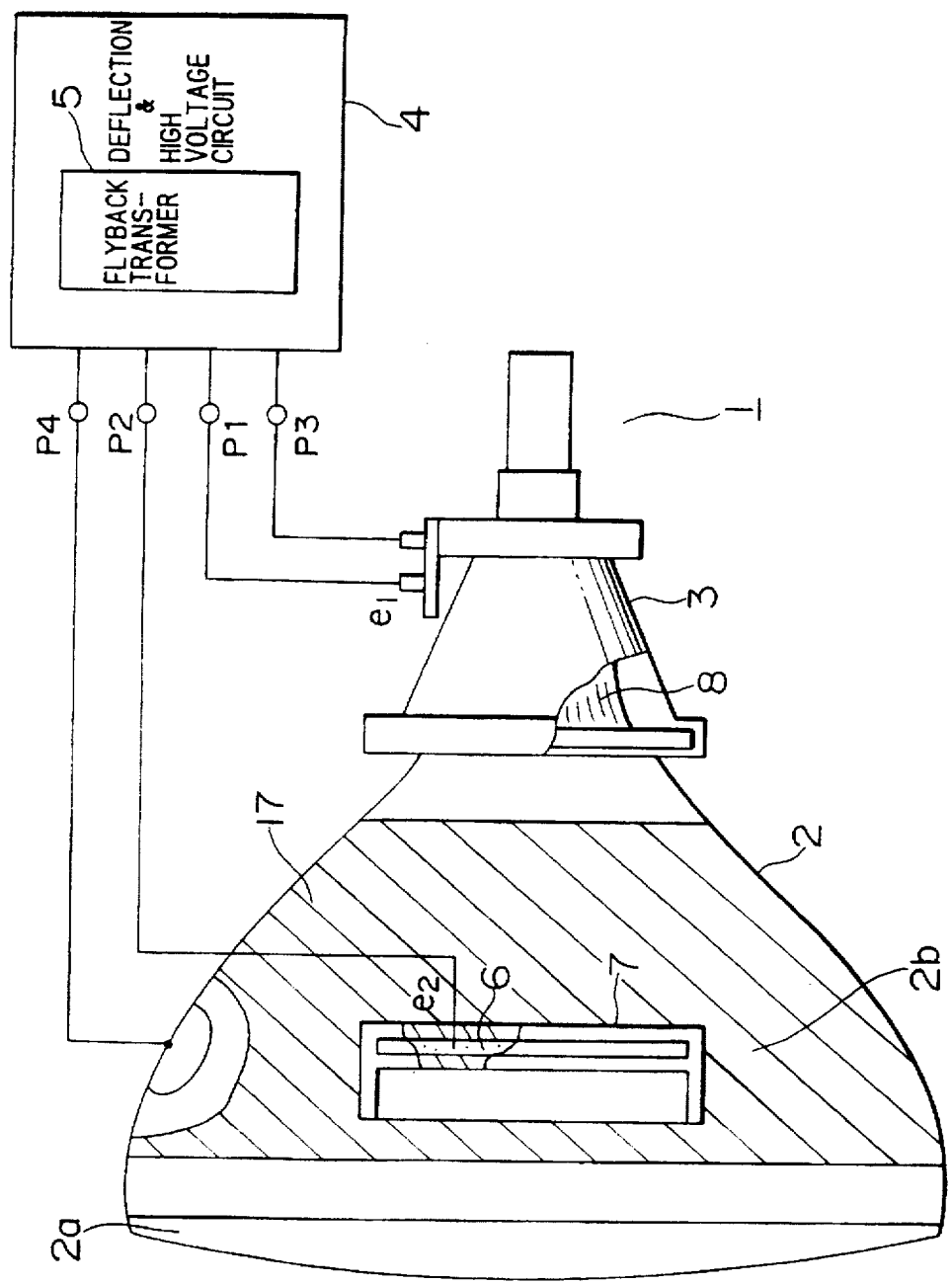
FIG. 1 is a side view partially broken of a first embodiment of a cathode-ray tube apparatus according to the present invention.
Figure 2:
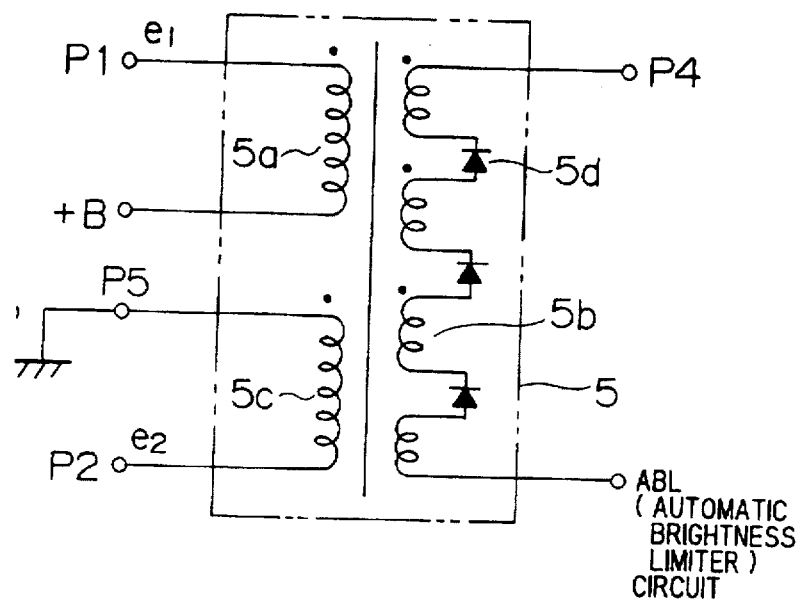
FIG. 2 is a circuit diagram of a flyback transformer of the deflection and high voltage circuit shown in FIG. 1.

FIG. 1 is a side view partially broken of the cathode-ray tube apparatus according to the first embodiment of the present invention. FIG. 2 is a circuit diagram of a flyback transformer of the deflection and high voltage circuit shown in FIG. 1, and FIG. 3 is a perspective view partially broken of the electric field cancellation electrode shown in FIG. 1.

Figure 3:
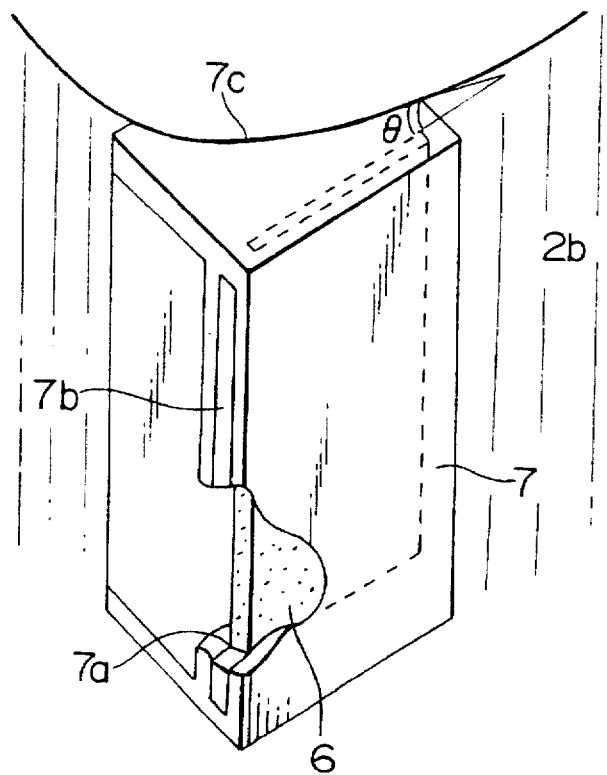
FIG. 3 is a perspective view partially broken of the electric field cancellation electrode shown in FIG. 1.

In FIGS. 1 to 3, reference numeral 1 represents a cathode-ray tube apparatus, reference numeral 2 represents a cathode-ray tube, reference numeral 3 represents a deflection yoke, reference numeral 4 represents a deflection and high voltage circuit, reference numeral 5 represents a flyback transformer, reference numeral 6 represents an electric field cancellation electrode, reference numeral 7 represents an insulator, and reference numeral 8 represents a horizontal deflection coil.

The first embodiment of the present invention features in that the flyback transformer 5 in the deflection and high voltage circuit 4 is provided with a reverse pulse voltage generation function, and the electric field cancellation electrode 6 is mounted on the funnel portion 2b of the cathode-ray tube 2.

The flyback transformer 5 is housed within the deflection and high voltage circuit 4 which has terminals P1 and P3 connected to the horizontal deflection coil 8, a terminal P2 connected to the electric field cancellation electrode 6, and a high voltage output terminal P4 connected to the anode of the cathode-ray tube 2. As the reverse pulse voltage generation function, a reverse pulse voltage e2 (about 200 V) is generated at the terminal P2, this pulse voltage e2 being opposite in polarity to the high pulse voltage e1 (about 1000 V) applied to the horizontal deflection coil 8 of the deflection yoke 3 via the terminal P1.

As shown in FIG. 2, the flyback transformer 5 has an induction coil 5c in addition to the basic elements of primary and secondary coils 5a and 5b. The primary coil is connected between the horizontal deflection output terminal P1 and +B power source, and the secondary coil has serially connected diodes 5d and outputs a high voltage from the terminal P4. One end of the induction coil 5c is grounded at a terminal P5, and the other end is connected to the electric field cancellation electrode 6 at the terminal P2. As a result, the pulse voltage e2 opposite in polarity to the high pulse voltage e1 at the terminal P1 is generated at the terminal P2 of the induction coil 5c.

The electric field cancellation electrode 6 is mounted on the funnel portion 2b of the cathode-ray tube 2, this electrode 6 being mounted on the opposite side of the funnel portion 2b as viewed in FIG. 1. The electric field cancellation electrode 6 is applied with the opposite polarity (or reverse) pulse voltage e2 at the terminal P2, and generates an electric field substantially proportional to the voltage e2.

The electric field cancellation electrode 6 is made of a conductive metal plate (e.g., copper), and is inserted in a slot portion 7a formed in an insulation frame 7. The slot portion 7a is covered with an insulation cover 7b. The surface 7c of the insulation frame 7 is a contact surface with the funnel portion 2b of the cathode-ray tube 2, and has an acute angle θ (θ<90°) relative to the surface of the electric field cancellation electrode 6. As a result, the electric field cancellation electrode 6 can be mounted on the funnel portion 2b of the cathode-ray tube 2 generally in parallel with the fluorescent surface 2a, efficiently radiating an electric field from the electric field cancellation electrode 6 toward the fluorescent surface 2a. Since the electric field cancellation electrode 6 can be spaced apart from an electrically grounded carbon 17 on the surface of the funnel portion 2b, stray capacity therebetween can be reduced.

The operation of the electric field cancellation electrode 6 will be described in more detail.

Figure 4:
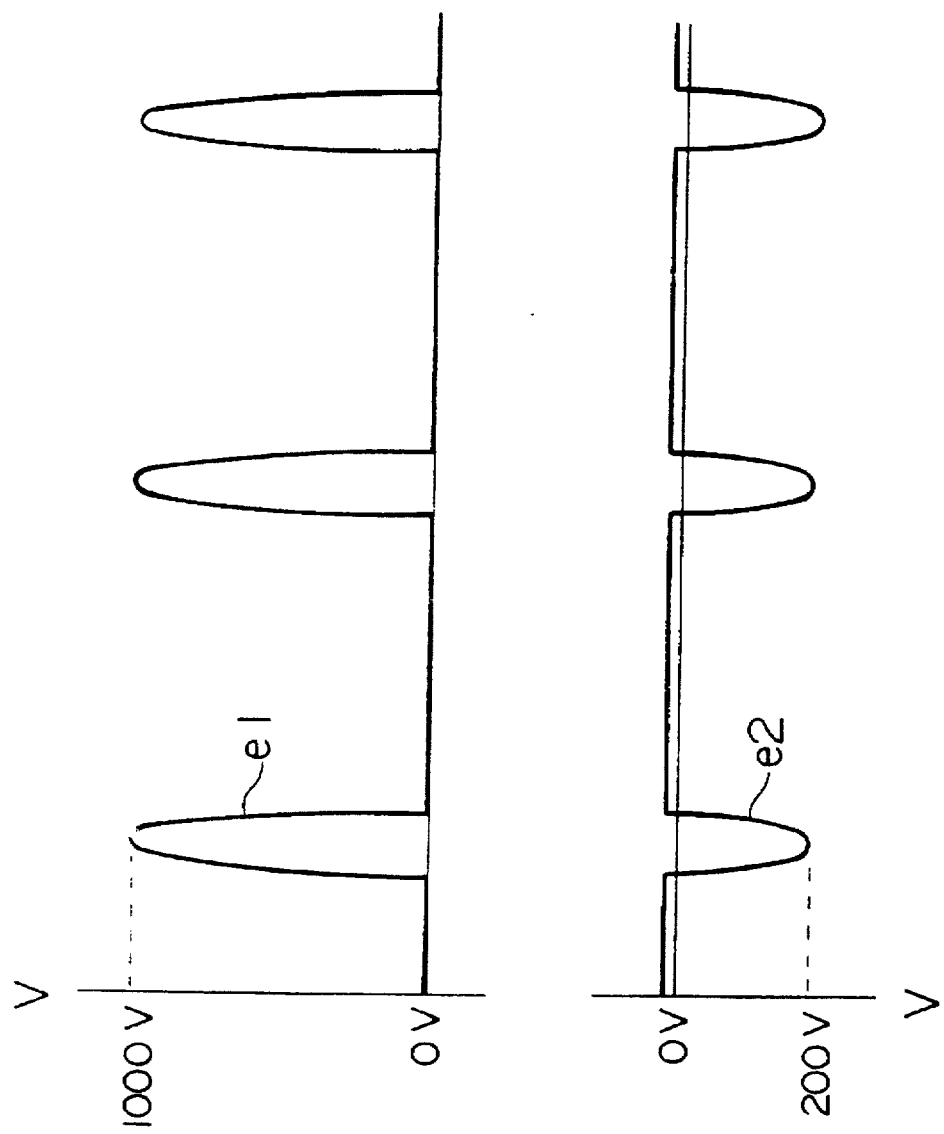
FIG. 4 shows the waveforms of a high pulse voltage e1 applied to the horizontal deflection coil 8 of the deflection yoke 3 and reverse polarity pulse voltage e2 generated by the flyback transformer 5, shown in FIG. 1.

FIG. 4 is a diagram showing the waveforms of the high pulse voltage e1 applied to the horizontal deflection coil 8 of the deflection yoke 3 and the opposite polarity pulse voltage e2 generated by the flyback transformer 5.

As shown in FIG. 4, the pulse voltages e1 and e2 have the same phase but opposite polarities. The amplitude of the pulse voltage e1 is generally as high as about 1000 V. As a result, the horizontal deflection coil 8 connected to the horizontal deflection output terminal P1 acts as the electrode which omni-directionally radiates a high frequency electric field and radiates it to the outside of the cathode-ray tube apparatus 1 with its intensity being generally proportional to the pulse voltage e1 at the horizontal deflection output terminal P1.

On the other hand, the electric field cancellation electrode 6 which is applied with the pulse voltage e2 about 200 V opposite in polarity to the pulse voltage e1, radiates an electric field to the outside of the cathode-ray tube apparatus 1, with its intensity being generally proportional to the pulse voltage e2. This electric field cancels the high frequency electric field radiated outside of the cathode-ray tube apparatus 1 from the deflection yoke 3, so that the high frequency electric field can be reduced to the extent that other electronic apparatuses are not adversely affected and users are not subjected to health injurious conditions.

Even if the pulse voltage e2 applied to the electric field cancellation electrode 6 is made small, the same effects of reducing the high frequency electric field can be obtained so long as the area of the electric field cancellation electrode 6 is made large.

Figure 5:
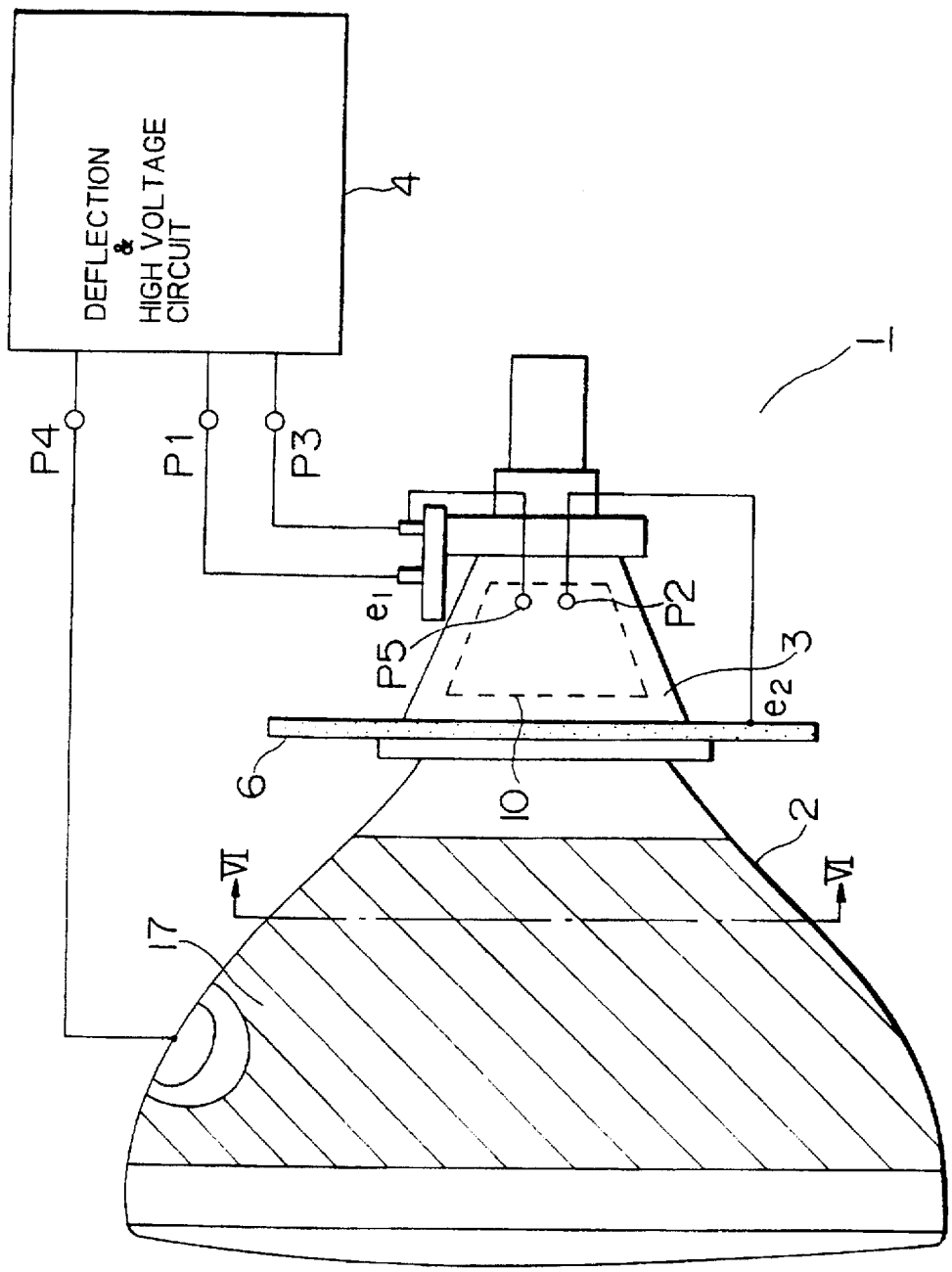
FIG. 5 is a side view of a second embodiment of the cathode-ray tube apparatus according to the present invention.
Figure 6:
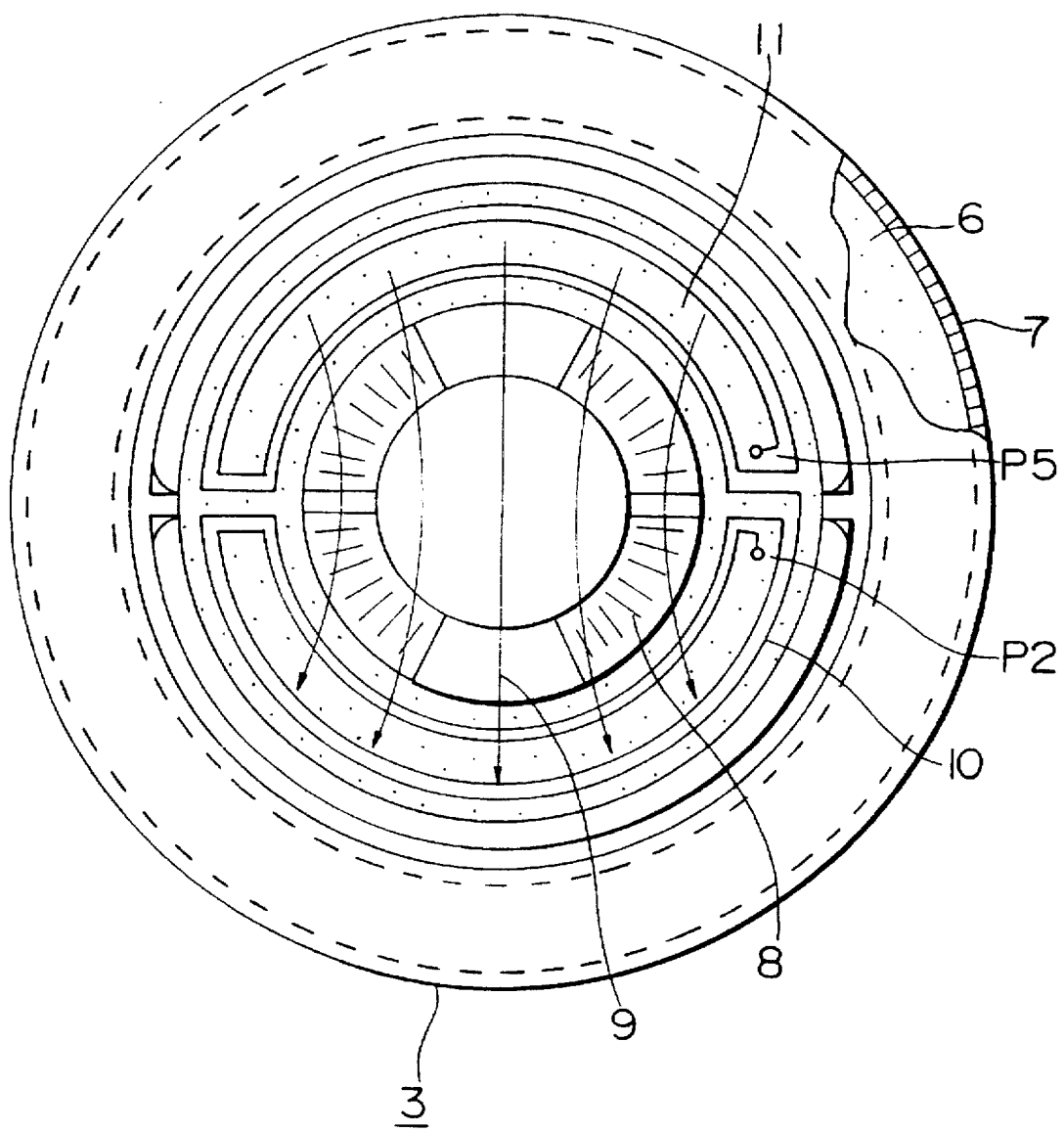
FIG. 6 is a front view partially broken of the deflection yoke taking along line VI—VI in FIG. 5.

FIG. 5 is a side view showing the cathode-ray tube apparatus according to the second embodiment of the present invention, and FIG. 6 is a front view partially broken of the deflection yoke taken along line VI—VI of FIG. 5.

In FIGS. 5 and 6, reference numeral 9 represents a horizontal deflection magnetic field, reference numeral 10 represents an induction coil, and reference numeral 11 represents an insulator. In FIGS. 5 and 6, identical reference numerals to FIG. 1 represent elements having the similar structure.

The second embodiment of the present invention features in that the induction coil 10 having a reverse pulse voltage generation function is mounted on the deflection yoke 3 and the electric field cancellation electrode 6 is mounted on the outer peripheral portion of the deflection yoke 3 on the fluorescent surface side.

The induction coil is mounted on the inner surface of the deflection yoke 3 to interlink or magnetically capped with the horizontal deflection magnetic field 9. One end of the induction coil 10 at a terminal P5 is connected to the low voltage side terminal P3 of the horizontal deflection coil 8, and the other end at the terminal P2 is connected to the electric field cancellation electrode 6.

The electric field cancellation electrode 6 is made of a metal plate of a ring shape, with its peripheral portion being covered with an insulation frame. The electric field cancellation electrode 6 is mounted on the deflection yoke 3 at the outer peripheral portion on the fluorescent surface side.

In the second embodiment of the present invention, the induction coil 10 generates the reverse pulse voltage e2 having the voltage waveform such as shown in FIG. 4 because the horizontal deflection magnetic field 9 changes rapidly during the horizontal blanking period. As a result, the electric field cancellation electrode 6 connected to the induction coil 10 radiates a high frequency electric field having an intensity generally proportional to the pulse voltage e2 to the outside of the cathode-ray tube apparatus 1, to thereby cancel the high frequency electric field radiated outside of the cathode-ray tube apparatus 1 from the deflection yoke 3 and reduce the high frequency electric field. The second embodiment of the present invention has an advantage that the high frequency electric field can be reduced by changing only the deflection yoke 3 without changing other components.

The induction coil 10 is made of a coil conductive pattern formed on a film insulator 11 by means of printing or etching. The thickness of the induction coil 10 can therefore be made thin, and the deflection yoke 3 can be mounted more in contact with the funnel portion 2b of the cathode-ray tube 2. In the second embodiment of the present invention, the induction coil 10 is mounted on the surface of the horizontal deflection coil 8. Instead, the induction coil 10 may be placed at any other position where the horizontal deflection magnetic field 9 leaks.

Figure 7:
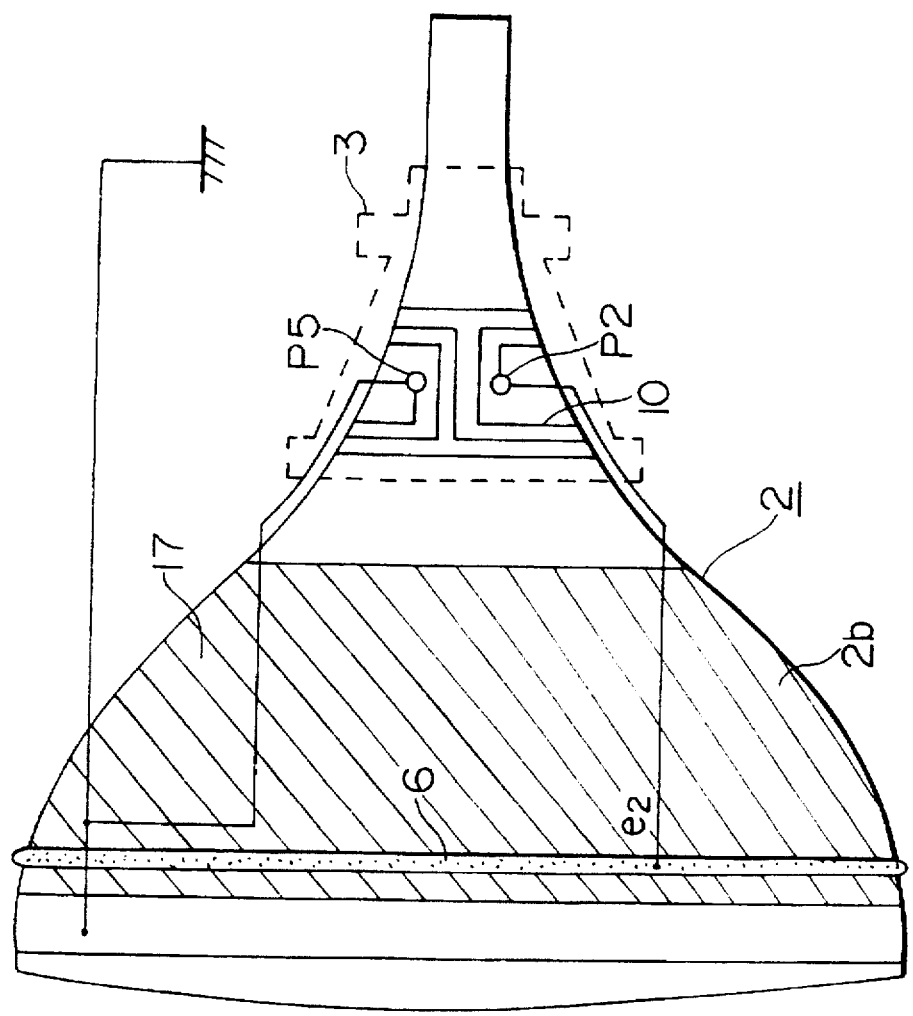
FIG. 7 is a side view of the cathode-ray tube of the cathode-ray tube apparatus according to a third embodiment of the present invention.

FIG. 7 is a side view of the cathode-ray tube of the cathode-ray tube apparatus according to the third embodiment of the present invention.

The third embodiment of the present invention features in that the induction coil having a reverse pulse voltage generation function is mounted on the cathode-ray tube 2, and the electric field cancellation electrode 6 is mounted on the outer peripheral portion of the fluorescent surface of the cathode-ray tube 2.

The induction coil 10 is mounted on a deflection yoke mount area indicated by a broken line on the funnel portion 2b of the cathode-ray tube 2, and disposed so as to interlink the horizontal deflection magnetic field 9 similar to the second embodiment. One end of the induction coil 10 at the terminal P5 is connected to the ground of the cathode-ray tube 2, and the other end at the terminal 2 is connected to the electric field cancellation electrode 6.

The electric field cancellation electrode 6 is made of a conductive wire having an insulating sleeve and mounted on the outer peripheral portion of the cathode-ray tube on the fluorescent surface side.

In the third embodiment of the present invention, the induction coil 10 generates the opposite polarity pulse voltage e2 having the waveform such as shown in FIG. 4 because the horizontal deflection magnetic field 9 changes rapidly during the horizontal blanking period. As a result, the electric field cancellation electrode 6 connected to the induction coil 10 radiates an electric field generally proportional to the pulse voltage e2 to the outside of the cathode-ray tube apparatus 1 to thereby cancel and reduce the high frequency electric field radiated from the deflection yoke 3 to the outside of the cathode-ray tube apparatus 1. The third embodiment of the present invention has an advantage that the high frequency electric field can be reduced by modifying only on the cathode-ray tube 2 side.

In the third embodiment of the present invention, the electric field cancellation electrode 6 is made of a conductive wire with an insulating sleeve. Therefore, the intensity of the canceled electric field can be easily controlled by changing the total area of the electric field cancellation electrode 6.

The method of mounting the electric field cancellation electrode 6 on the cathode-ray tube 2 is not limited only to the third and first embodiments. The electric field cancellation electrode 6 may be formed on the cathode-ray tube 2 by disconnecting part of the carbon 17 on the funnel portion 2b of the cathode-ray tube 2.

Figure 8:
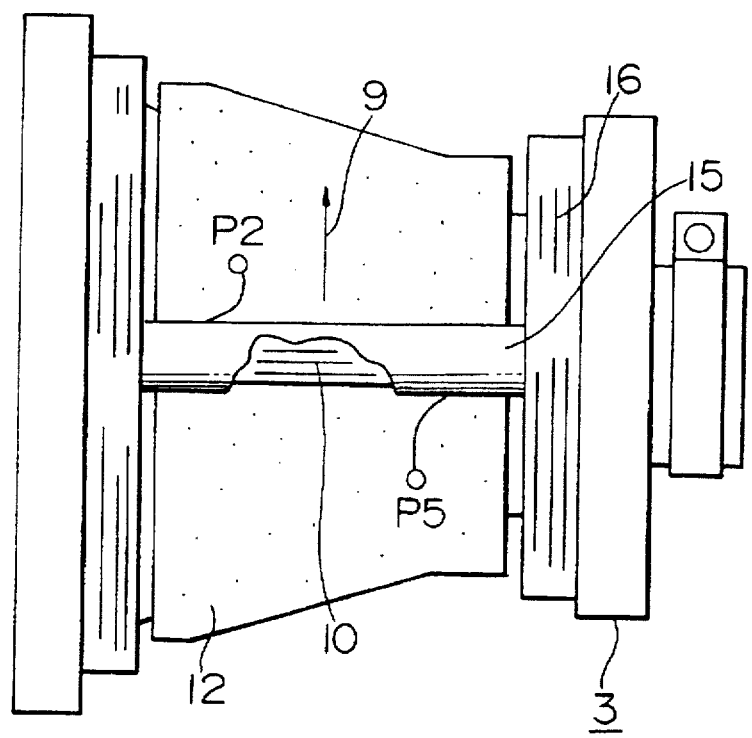
FIG. 8 is a side view partially broken of the deflection yoke of the cathode-ray tube apparatus according to a fourth embodiment of the present invention.

FIG. 8 is a side view partially broken of the deflection yoke of the cathode-ray tube apparatus according to the fourth embodiment.

In FIG. 8, reference numeral 12 represents a core, reference numeral 15 represents an insulation film, and reference numeral 16 represents a vertical deflection coil.

The fourth embodiment of the present invention features in that the induction coil 10 having a reverse pulse voltage generation function is mounted on the core 12 of the deflection yoke 3. As the electric field cancellation electrode 6, any one of the above-described embodiments may be used.

The induction coil 10 is wound on the core 12 of the deflection yoke 3 in a troidal form, and disposed so as to interlink the horizontal deflection magnetic field 9 while insulating from the vertical deflection coil 16 by means of an insulation tape 15. One end of the induction coil at the terminal P5 is connected the low voltage side of the horizontal deflection coil 8 or to the terminal having a low potential relative to the high frequency pulse, such as ground, and the other end at the terminal P2 is connected to the electric field cancellation electrode 6.

In the fourth embodiment of the present invention, the induction coil 10 generates the opposite polarity pulse voltage e2 having the waveform such as shown in FIG. 4 because the horizontal deflection magnetic field 9 changes rapidly during the horizontal blanking period. As a result, the electric field cancellation electrode 6 connected to the induction coil 10 radiates an electric field generally proportional to the pulse voltage e2 to the outside of the cathode-ray tube apparatus 1 to thereby cancel and reduce the high frequency electric field radiated from the deflection yoke 3 to the outside of the cathode-ray tube apparatus 1. The fourth embodiment of the present invention has an advantage that the reverse pulse voltage e2 necessary for the cancellation of the high frequency electric field can be obtained by modifying only on the deflection yoke 3 side.

Figure 10:
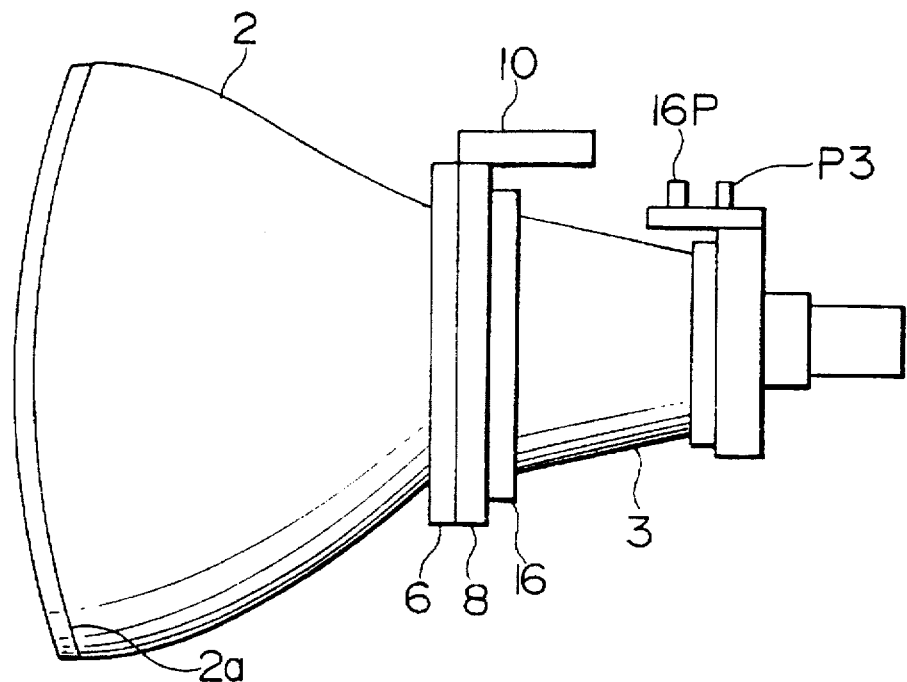
FIG. 10 is a side view of the deflection yoke of the cathode-ray tube apparatus according to a sixth embodiment of the present invention.

FIG. 10 is a circuit diagram of an impedance conversion transformer used with the cathode-ray tube apparatus according to the fifth embodiment of the present invention.

Figure 9:
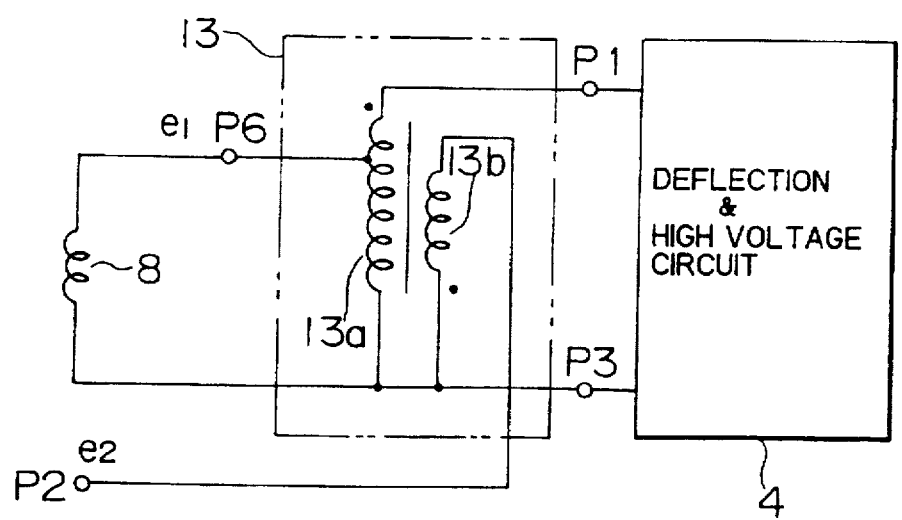
FIG. 9 is a circuit diagram of the impedance conversion transformer of the cathode-ray tube apparatus according to a fifth embodiment of the present invention.

In FIG. 9, reference numeral 13 represents the impedance conversion transformer.

The fifth embodiment of the present invention features in that the impedance conversion transformer 13 of the horizontal deflection coil 8 has a reverse pulse voltage generation function. The electric field cancellation electrode 6 may be any one of those of the above-described embodiments.

The transformer 13 has a primary coil 13a and an induction coil 13b. One end of the induction coil 13b is connected to the low voltage terminal P3 for the horizontal deflection output, and the other end at the terminal P2 is connected to the electric field cancellation electrode 6.

In the fifth embodiment of the present invention, the high frequency electric field radiated from the deflection yoke 3 to the outside of the cathode-ray tube apparatus 1 can be canceled by providing the transformer 13 and electric field cancellation electrode 6 without changing the cathode-ray tube 1 side and deflection and high voltage circuit 4 side.

In the transformer 13, the primary coil 13a connected to the terminal P1 of the deflection and high voltage circuit 4 has an intermediate tap P6 connected to the horizontal deflection coil 8, to share part of the coil as the secondary coil. If the turn ratio of the secondary coil to the primary coil of the transformer 8 is 1, the position of the intermediate tap P6 is the same as the terminal P1.

In the above-described embodiments, the effects of reducing the high frequency electric field radiated outside of the cathode-ray tube apparatus 1 are the same irrespective of the d.c. voltage superposed on the reverse pulse voltage e2 outputted from each induction coil 5c, 10, 13b. Therefore, of both the terminals of each induction coil 5c, 10, 13b, the potential at the terminal P5 not connected to the electric field cancellation electrode 6 is not limited to ground potential, but may be any of other d.c. potentials.

Figure 11:
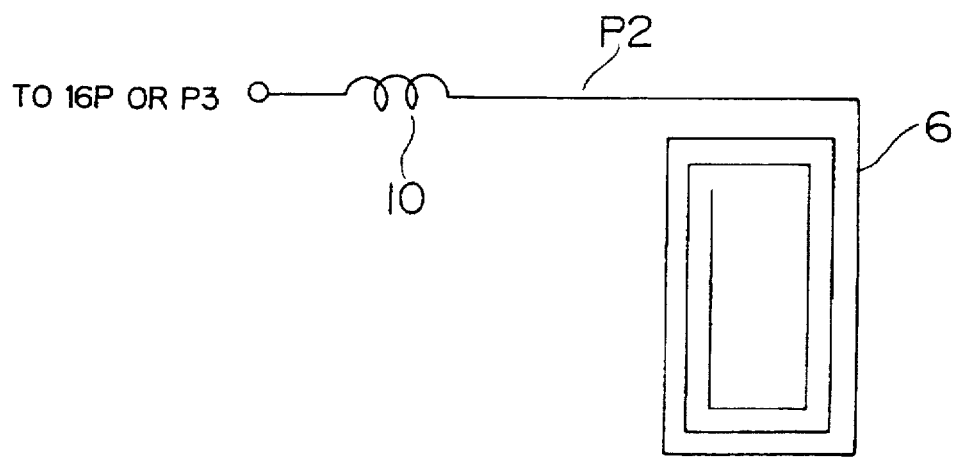
FIG. 11 is a diagram showing connections between the electric field cancellation electrode and induction coil shown in FIG. 10.

FIG. 10 is a side view of the deflection yoke 3 mounted on the cathode-ray tube 2 according to the sixth embodiment of the present invention, and FIG. 11 shows the connections between the induction coil 10 and electric field cancellation electrode 6 of the sixth embodiment. FIG. 4 shows the pulse voltage e1 applied to the horizontal deflection coil 6 of the sixth embodiment and the reverse pulse voltage e2 generated by the induction coil 10. In these figures, reference numeral represents a deflection yoke, reference numeral 8 represents horizontal deflection coil, reference numeral 16 represents a vertical deflection coil, reference numeral 10 represents an induction coil, reference numeral 6 represents an electric field cancellation electrode, reference numeral 2 represents a cathode-ray tube, reference numeral p3 represents the low voltage terminal of the horizontal deflection coil, reference numeral 16P represents the low voltage terminal of the vertical deflection coil, reference numeral P2 represents a reverse pulse generation terminal of the induction coil 10, reference numeral 2a represents a fluorescent surface, reference numeral e1 represents a pulse voltage applied to the horizontal deflection coil 8, and reference numeral e2 represents a reverse pulse voltage applied to the induction coil 10.

The sixth embodiment of the present invention features in that the deflection yoke 3 is provided with the electric field cancellation electrode 6 made of a conductive wire or a film conductive wire so as to reduce the high frequency electric field near the deflection yoke 3 generated by the pulse voltage e1 applied to the horizontal deflection coil 8, that the induction coil 10 for generating the pulse voltage e2 opposite in polarity to the pulse voltage e1 is disposed to interlink the horizontal deflection magnetic field, and that one end of the induction coil 10 is connected to either the low voltage terminal P3 of the horizontal deflection coil 8 or to the low voltage terminal of the vertical deflection coil 16, and the other terminal is connected to the electric field cancellation electrode 6. A reverse parabolic wave voltage of the horizontal deflection period which is effective for the reduction of the electric field is generated at the low voltage terminal P3 of the horizontal deflection coil 8. This parabolic wave voltage is generated when a sawtooth wave horizontal deflection current flows through a capacitor (not shown) connected to the low voltage side of the horizontal deflection coil 8. At the low voltage terminal 16 of the vertical deflection coil 16, a voltage like a d.c. voltage, although it changes slightly with the vertical deflection period, is generated. This voltage has substantially the same effects as the ground potential from the viewpoint of reduction of an electric field.

As shown in FIG. 10, the induction coil 10 is mounted on the upper portion of the fringe of the horizontal deflection coil 8 on the aperture side of the fluorescent surface 2a. As shown in the connection diagram of FIG. 11, the electric field cancellation electrode 6 is connected to the reverse pulse generation terminal P2 of the induction coil 10, and mounted on the fringe of the horizontal deflection coil 8 on the fluorescent surface 2a side. The horizontal deflection magnetic field rapidly changing during the horizontal blanking period is generated from the area of the fringe. Therefore, the induction coil 10 generates the pulse voltage e2 opposite in polarity to the pulse voltage e1 applied to the horizontal deflection coil 8 as shown in FIG. 4. This reverse pulse voltage e2 is proportional to the number of turns of the induction coil 10. The amplitude of the pulse voltage e1 is as high as about 1000 V which is applied to the horizontal deflection coil 8, so that the high frequency electric field is radiated from the deflection yoke 3 to the outside of the cathode-ray tube apparatus. The reverse pulse voltage e2 is applied to the electric field cancellation electrode 6 to radiate the electric field generally proportional to the reverse voltage e2 to the outside. Accordingly, the high frequency electric field radiated from the deflection yoke 3 to the outside is canceled to greatly reduce the electric field. Since the electric field cancellation electrode 6 is made of a conductive wire or a film conductive wire, an eddy current is hard to be generated as compared with the plate conductive material, advantageously reducing the heat generation. Furthermore, the total area of the electric field cancellation electrode 6 can be changed easily by changing the length of the conductive wire, so that the intensity of the canceled electric field can be easily controlled. The sixth embodiment of the present invention has an advantage of reducing the high frequency electric field by introducing the structure mounting only the induction coil 10 and electric field cancellation electrode 6 on the deflection yoke 3.

Figure 12:
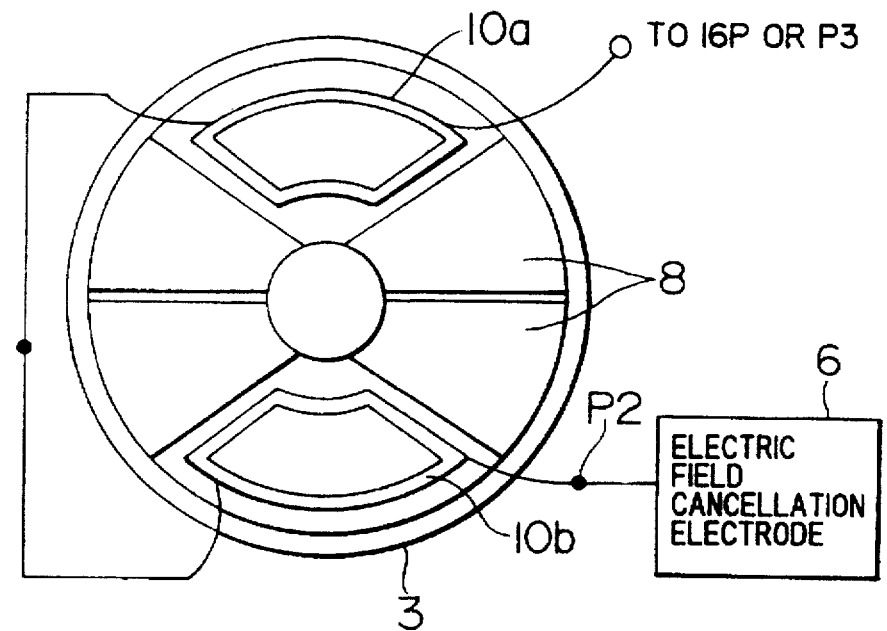
FIG. 12 is a front view of the deflection yoke of the cathode-ray tube apparatus according to a seventh embodiment of the present invention.
Figure 13:
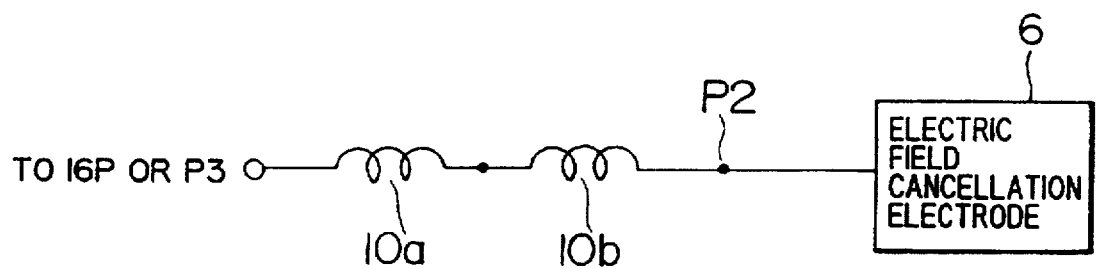
FIG. 13 is a diagram showing connections between the electric field cancellation electrode and induction coil shown in FIG. 12.

FIG. 12 is a diagram showing the deflection yoke 3 according to the seventh embodiment of the present invention, as viewed from the aperture side of the horizontal deflection coil 8 on the fluorescent surface 2a side. FIG. 13 is a diagram showing connections between the induction coil 10 and electric field cancellation electrode 6. The seventh embodiment of the present invention features in that a plurality of serially connected induction coils 10 are provided and connected to the electric field cancellation electrode 6. In the embodiment shown in FIG. 12, two induction coils 10 are used. The two induction coils 10a and 10b are mounted at upper and lower windows where there is no horizontal deflection coil 8. As shown in FIG. 13, the induction coils 10a and 10b are serially connected. One end of the induction coil 10a is connected to the low voltage terminal P3 of the horizontal deflection coil 8 or to the low voltage terminal 16P of the vertical deflection coil 16, and one end of the induction coil 10b is connected to the electric field cancellation electrode 6 made of a conductive wire of film conductive wire.

In the seventh embodiment of the present invention, the induction coils 10a and 10b are mounted at the upper and lower windows of the horizontal deflection coil 8 to interlink the horizontal deflection magnetic field and generate the reverse pulse voltage e2 on both the induction coils 10a and 10b. The sum of reverse pulse voltages generated on the induction coils 10a and 10b is applied to the electric field cancellation electrode 6, increasing the effects of reducing the electric field.

Figure 15:
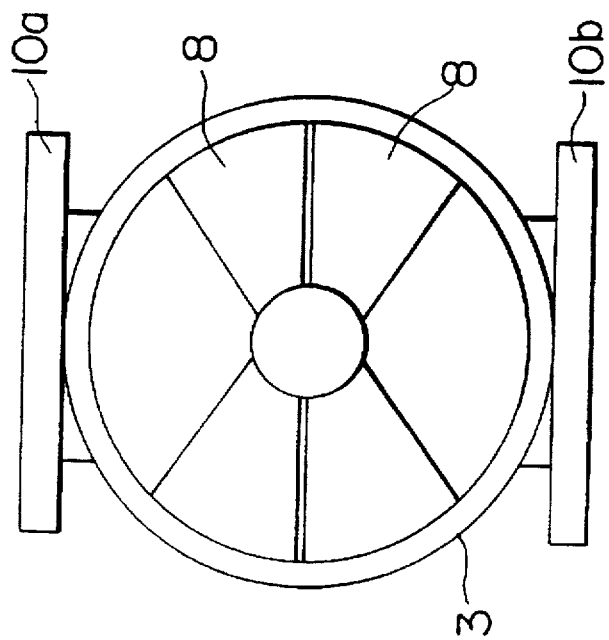
FIG. 15 is a front view of the deflection yoke taken along line XV—XV in FIG. 14.
Figure 14:
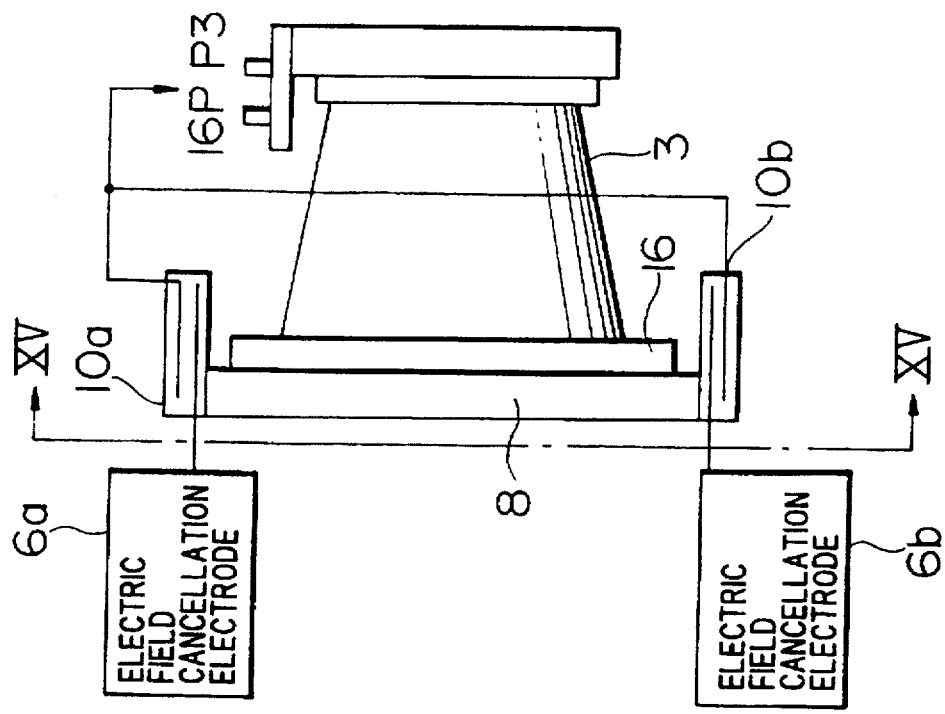
FIG. 14 is a side view of the deflection coil of the cathode-ray tube apparatus according to an eighth embodiment of the present invention.
Figure 16:
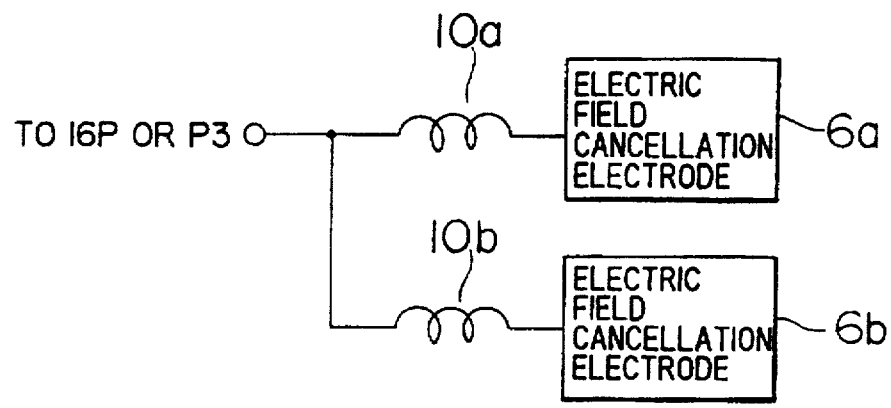
FIG. 16 is a diagram showing connections of the eighth embodiment shown in FIG. 14.

FIG. 14 is a side view of the deflection yoke 3 according to the eighth embodiment of the present invention, FIG. 15 shows the deflection yoke shown in FIG. 14 taken along line XV—XV as viewed from the aperture of the horizontal deflection coil 8 on the fluorescent surface 2a side, and FIG. 16 is a connection diagram of the eighth embodiment. The eighth embodiment of the present invention features in that a plurality of induction coils 10 are provided and connected to the electric field cancellation electrodes 6. The induction coils 10a and 10b are mounted on the fringe portion of the horizontal deflection coil 8 at the upper and lower positions, as shown in FIGS. 14 and 15. As shown in FIG. 16, one ends of the induction coils 10a and 10b are connected to the low voltage terminal P3 of the horizontal deflection coil 8 or to the low voltage terminal 16P of the vertical deflection coil 16, and the other ends are connected to the electric field cancellation electrodes 6a and 6b.

In the eighth embodiment of the present invention, the induction coils 10a and 10b are mounted on the fringe portion of the horizontal deflection coil 8 to interlink the horizontal deflection magnetic field and generate the reverse pulse voltage e2 on both the induction coils 10a and 10b. The reverse pulse voltages are applied to the electric field cancellation electrodes 6a and 6b to cancel and reduce the electric field generated from the deflection yoke 3.

In the eight embodiment of the present invention, a plurality of electric field cancellation electrodes are provided and disposed at the positions where the intensity of the electric field of the deflection yoke 3 is strong, to thereby increase the effects of reducing the electric field.

Figure 17:
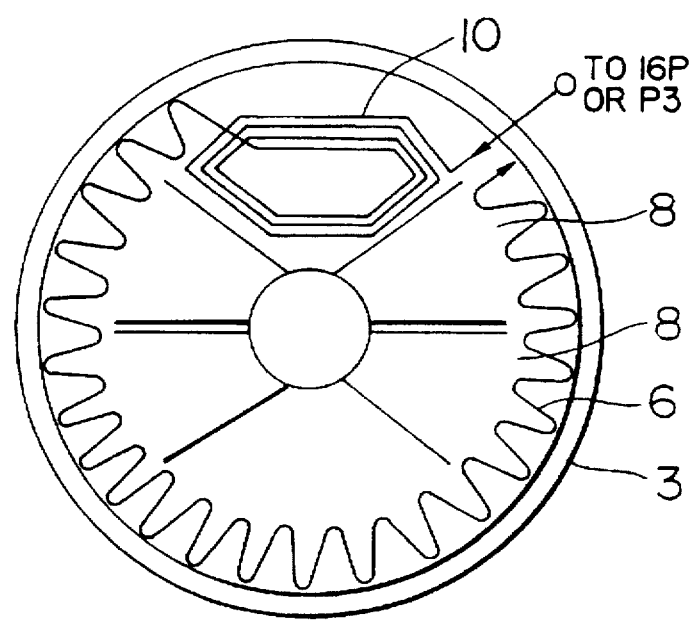
FIG. 17 is a front view of the deflection yoke of the cathode-ray tube apparatus according to a ninth embodiment of the present invention.
Figure 18:
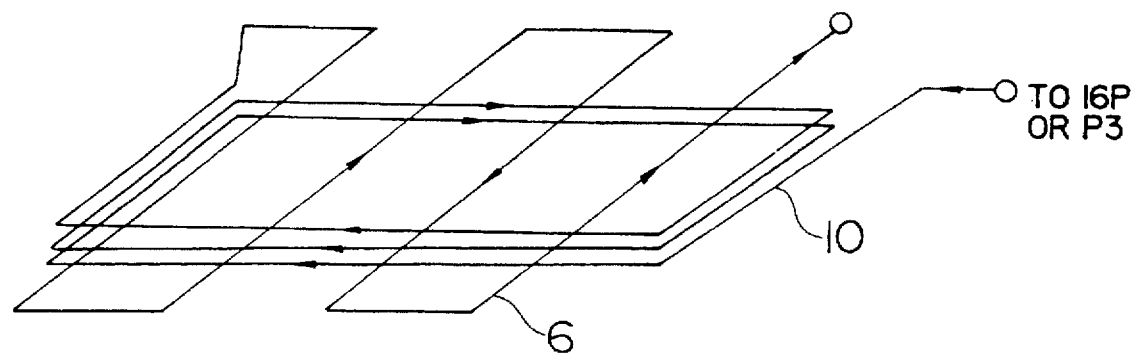
FIG. 18 show other induction coil and electric field cancellation electrode of the ninth embodiment of the present invention.
Figure 19:
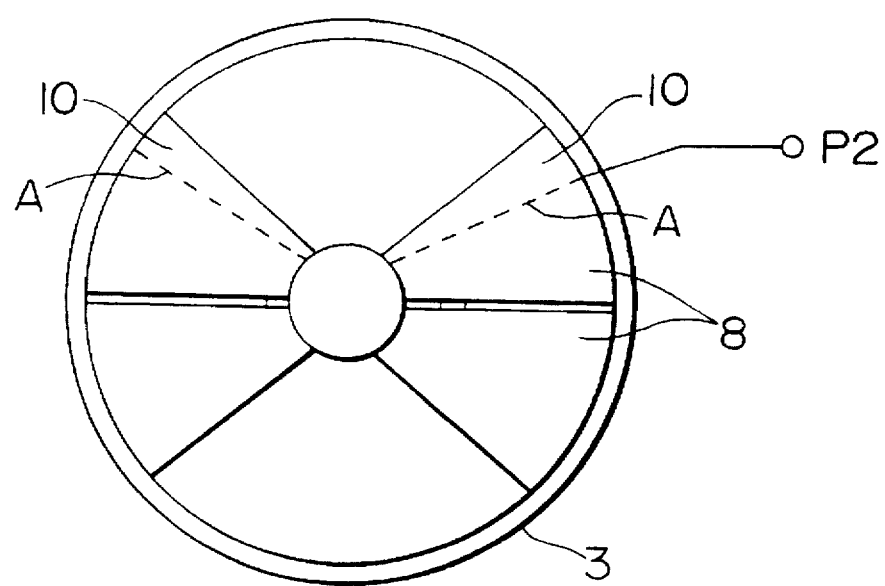
FIG. 19 is a front view of the deflection yoke of the cathode-ray tube apparatus according to a tenth embodiment of the present invention.

FIG. 17 shows the deflection yoke 3 according to the ninth embodiment of the present invention as viewed from the aperture of the horizontal deflection coil 8 on the fluorescent surface 2a side. The ninth embodiment of the present invention features in that the induction coil 10 and electric field cancellation electrode 6 are continuously formed by using the same conductive wire. As shown in FIG. 19, the induction coil 10 is mounted at the window of the horizontal deflection coil 8, and the electric field cancellation electrode 6 is formed by a conductive wire turned in a corrugated shape. FIG. 18 shows another induction coil 10 and electric field cancellation electrode 6 of the ninth embodiment. As shown in FIG. 18, the rectangular induction coil 10 such as shown in FIGS. 14 and 15 is mounted on the fringe portion of the horizontal deflection coil 8, and the rectangular electric field cancellation electrode 6 is mounted above the induction coil 10. The induction coil 10 and electric field cancellation electrode 6 are continuously formed by using the same conductive wire.

In the ninth embodiment of the present invention, the induction coil 10 and electric field cancellation electrode 6 are continuously formed by using the same conductive wire, reducing the cost required for the connection therebetween. In addition, the reliability is improved because of no connection. Since the induction coil 10 and electric field cancellation electrode 6 are integrally formed, only the induction coil 10 may be fitted in the aperture of the horizontal deflection coil 8 on the fluorescent surface 2a side as shown in FIG. 19, or an integral component of the induction coil 3 and electric field cancellation electrode 6 may be mounted on the fringe portion of the horizontal deflection coil 8 as shown in FIG. 18.

Figure 20:
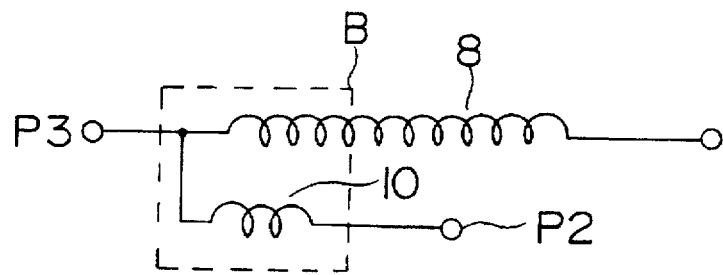
FIG. 20 is a diagram showing connections of the induction coil shown in FIG. 19.
Figure 21:
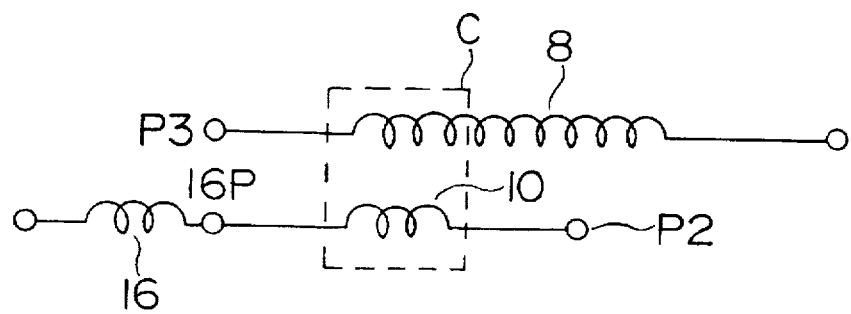
FIG. 21 is a diagram showing other connections of the induction coil shown in FIG. 19.

FIG. 19 shows the deflection yoke 3 according to the tenth embodiment of the present invention as viewed from the aperture of the horizontal deflection coil 8 on the fluorescent surface 2a side. FIGS. 20 and 21 show the connections of the induction coil 10 according to the tenth embodiment. The tenth embodiment of the present invention features in that the induction coil 10 and horizontal deflection coil 8 are wound at the same time, and one end of the induction coil 10 corresponding to the winding end thereof opposite in polarity to the winding start of the horizontal deflection coil, is connected to the low voltage terminal P3 of the horizontal deflection coil 8 or to the low voltage terminal 16P of the vertical deflection coil 16.

As shown in FIG. 19, the induction coil 10 is wound starting from the low voltage window side to the position indicated by broken lines A, at the same time the horizontal deflection coil 8 is wound. The reverse pulse generation terminal P2 of the induction coil 10 corresponding to the winding start is extended outward from the horizontal deflection coil 8. The connection between the induction coil 10 and horizontal deflection coil 8 is as follows. Namely, as shown in FIG. 20, the induction coil 10 is connected to the low voltage terminal P3 of the horizontal deflection coil 8, or as shown in FIG. 21, the induction coil 10 is connected to the low voltage terminal 16P of the vertical deflection coil 16. The windings encircled by broken lines in FIGS. 20 and 21 are wound at the same time for both the induction coil 10 and horizontal deflection coil 8.

In the tenth embodiment of the present invention, the induction coil 10 is wound on the low voltage side of the horizontal deflection coil 8 at the same time the latter coil is wound. The induction coil 10 is therefore integrally formed with the horizontal deflection coil 8 during the winding process of the horizontal deflection coil 8.

Figure 22:
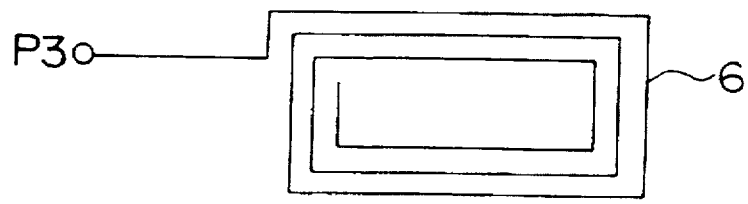
FIG. 22 shows the electric field cancellation electrode according to an eleventh embodiment of the present invention.
Figure 23:
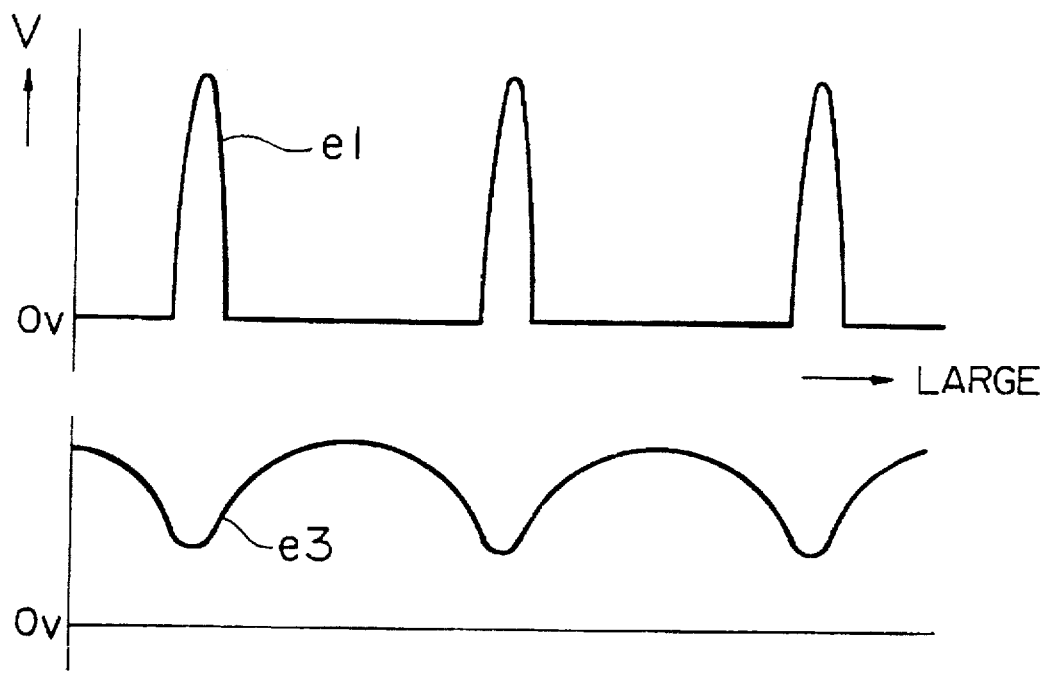
FIG. 23 shows voltage waveforms of the eleventh embodiment shown in FIG. 22.
Figure 24:
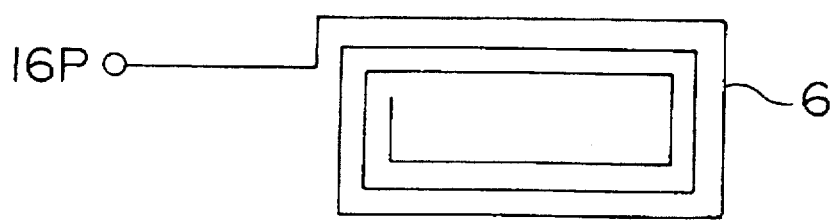
FIG. 24 shows the electric field cancellation electrode according to the eleventh embodiment of the present invention.

FIGS. 22 and 24 show the electric field cancellation electrode 6 used with the deflection yoke 3 according to the eleventh embodiment of the present invention. FIG. 23 shows waveforms obtained at the low voltage terminal P3 of the horizontal deflection coil 8 according to the eleventh embodiment. The eleventh embodiment of the present invention features in that the induction coil 10 is not used, but only the electric field cancellation electrode 6 is mounted on the deflection yoke 3 and connected to the low voltage terminal P3 of the horizontal deflection coil 8 or to the low voltage terminal 16P of the vertical deflection coil 16. In FIG. 22, the electric field cancellation electrode 6 is connected to the low voltage terminal P3 of the horizontal deflection coil 8. A parabolic wave voltage e3 shown in FIG. 23 opposite in polarity to the pulse voltage e1 applied to the horizontal deflection coil 8 is generated at the low voltage terminal P3 of the horizontal deflection coil 8. This parabolic wave voltage e3 is generated when a sawtooth waveform horizontal deflection current flows through a S-type capacitor (not shown) connected to the low voltage side of the horizontal deflection coil 8. This voltage e3 effectively cancels the high frequency electric field radiated from the deflection yoke 3 to the outside by the pulse voltage e1. In FIG. 24, the electric field cancellation electrode 6 is connected to the low voltage terminal 16P of the vertical deflection coil 16. The potential at the low voltage terminal 16P of the vertical deflection coil 16, although it changes more or less at the vertical deflection period, can be considered substantially as a d.c. voltage. As a result, when the electric field cancellation electrode 6 is connected to the low voltage terminal 16P of the vertical deflection coil 16, the effects of reducing the electric field same as when the electric field cancellation electrode 6 is connected to ground, can be obtained. If a size coil (not shown) or the like is connected to the low voltage side of the horizontal deflection coil 8 and a pulse voltage having the same polarity as the pulse voltage e1 is generated at the low voltage terminal P3 of the horizontal deflection coil 8, the effects of reducing the electric field can be improved by connecting the electric field cancellation electrode 6 to the low voltage terminal 16P of the vertical deflection coil 16.

Figure 25:
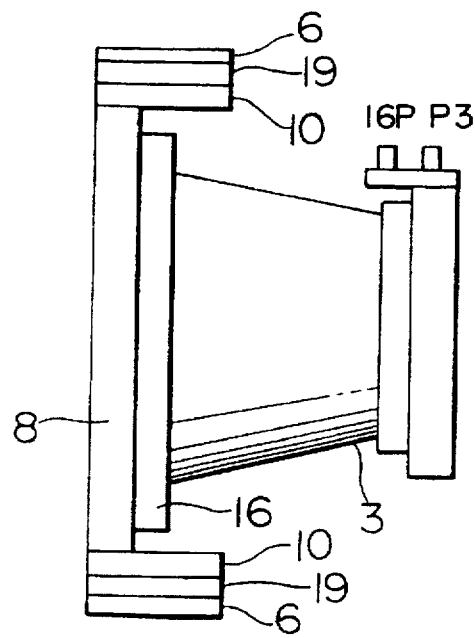
FIG. 25 is a side view of the deflection yoke according to a twelfth embodiment of the present invention.
Figure 26:
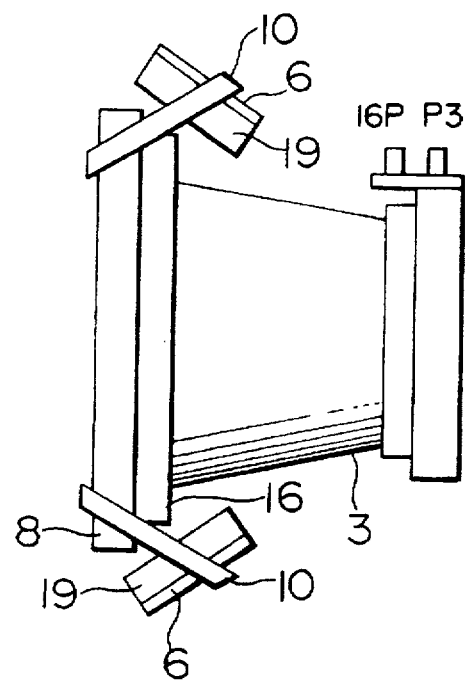
FIG. 26 is a side view of another deflection yoke according to the twelfth embodiment of the present invention.

FIGS. 25 and 26 are side views of the deflection yoke 3 according to the twelfth embodiment of the present invention. In FIGS. 25 and 26, reference numeral 19 represents a cancellation coil for canceling an unnecessary magnetic field radiated from the deflection yoke 3. The twelfth embodiment of the present invention features in that the induction coil 10 is mounted on the deflection yoke 3 at the position where the induction coil 10 interlinks the cancellation magnetic field generated by the cancellation coil 19 for canceling the unnecessary magnetic field radiated from the horizontal deflection coil 8, and the electric field cancellation electrode 6 is mounted covering the cancellation coil 19. FIG. 25 shows the structure wherein on the deflection yoke 3 mounted with cancellation coils 19 of an air core without using a ferrite core at the upper and lower positions of the horizontal deflection coil 8, there are mounted the induction coils 10 between the horizontal deflection coil 8 and cancellation coils 19 and the electric field cancellation electrodes 6 above the cancellation coils 19. FIG. 25 shows the structure wherein cancellation coils 19 with ferrite cores allowing the same effects with a small number of turns are mounted on the deflection yoke 3 at the upper and lower positions, induction coils 10 are mounted to surround the cancellation coils 19 and the fringe portion of the horizontal deflection coil 8, and electric field cancellation electrodes 6 are mounted above the cancellation coils 19.

In the twelfth embodiment of the present invention, the induction coils 10 are mounted near the cancellation coils 19. Therefore, both the cancellation magnetic field of the horizontal deflection period generated by the cancellation coils 19 and the deflection magnetic field generated by the horizontal deflection coil 8 interlink the induction coils 10, obtaining a pulse voltage of a large amplitude. Furthermore, the electric field cancellation electrodes 6 are mounted near the cancellation coils 19, so that the electric field radiated from the cancellation coils 19 can be reduced in a concentrated manner. Still further, both the induction coils 10 and electric field cancellation electrodes 6 are mounted on the cancellation coils 19, without requiring additional mounting space. If the bobbin of the cancellation coil 19 is made to allow both the induction coil 10 and electric field cancellation electrode 6 to be wound thereon, the productivity can be improved.

Figure 27:
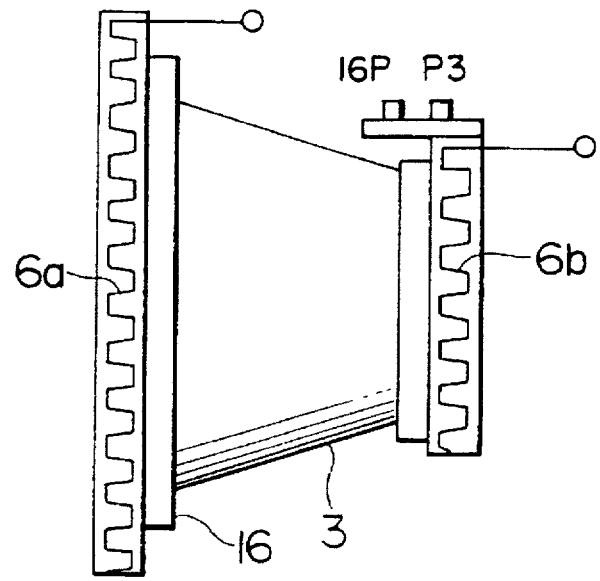
FIG. 27 is a side view of the deflection yoke according to a thirteenth embodiment of the present invention.
Figure 28:
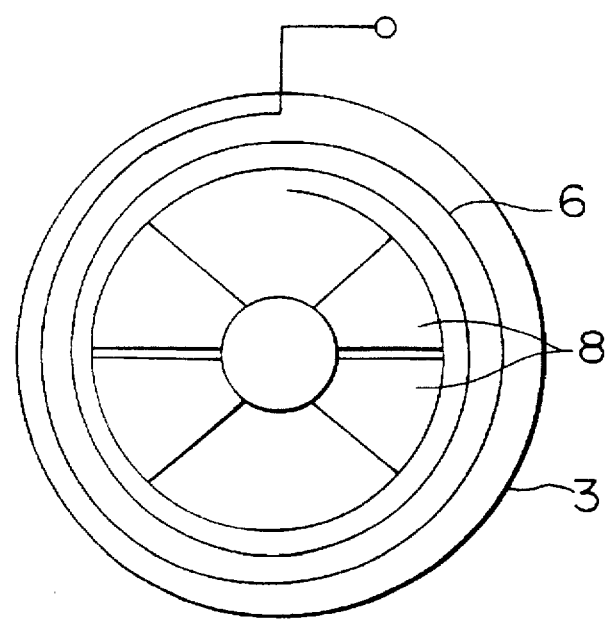
FIG. 28 is a front view of another deflection yoke according to the thirteenth embodiment of the present invention.
Figure 29:
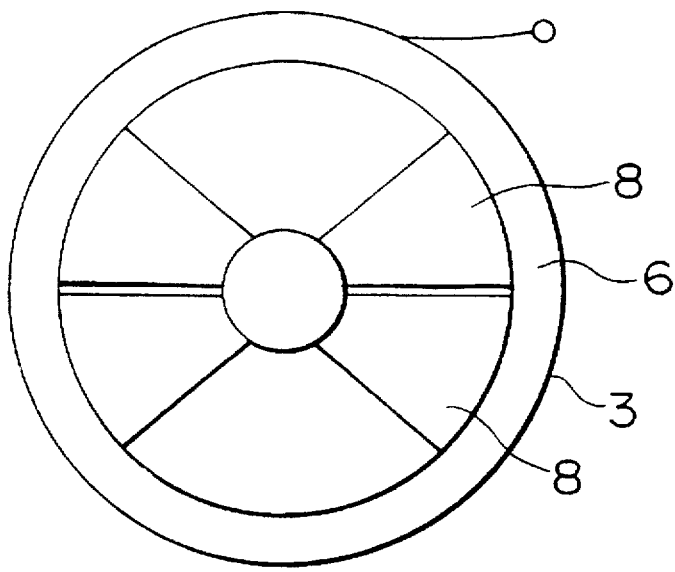
FIG. 29 is a front view of another deflection yoke according to the thirteenth embodiment of the present invention.
Figure 30:
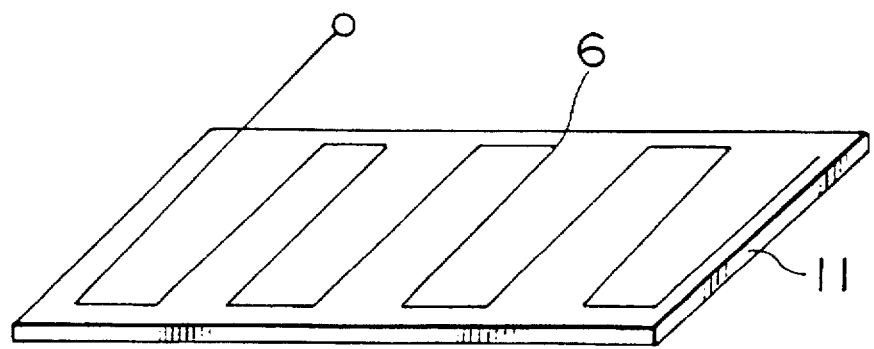
FIG. 30 shows another electric field cancellation electrode of the cathode-ray tube apparatus of the thirteenth embodiment of the present invention.

FIGS. 27 to 31 show the shapes and mount positions of the electric field cancellation electrode 6 on the deflection yoke 3 according to the thirteenth embodiment of the present invention. The thirteenth embodiment of the present invention features in that the electric field cancellation electrode 6 is mounted on the deflection yoke 3, covering the fringe portion of the horizontal deflection coil 8 or part of the inner surface of the deflection yoke 3, that the electric field cancellation electrode 6 is made of a ring coil, that the electric field cancellation electrode 6 is mounted on the front surface of the fringe portion of the horizontal deflection coil 8 so as to match the shape of the fringe portion, and that the electric field cancellation electrode 6 or induction coil 10 is made of a coil on a film insulator by forming a conductive pattern through printing or etching. FIG. 27 shows the structure wherein the electric field cancellation electrode 6a is mounted on the fringe portion of the horizontal deflection coil 8 on the fluorescent surface 2a side aperture side, and the electric field cancellation electrode 6b is mounted on the fringe outer peripheral portion of the horizontal deflection coil 8 on the electron gun side aperture side. FIG. 28 shows the structure wherein the electric field cancellation electrode 6 is formed in a spiral shape and mounted on the deflection yoke 6 covering part of the inner surface thereof. FIG. 29 shows the structure wherein the electric field cancellation electrode 6 is made of a ring coil, and mounted on the horizontal deflection coil 8 at the front fringe portion. FIG. 30 shows the structure wherein the induction coil 10 is made of a coil on a film insulator by forming a conductive pattern through printing or etching.

Figure 31:
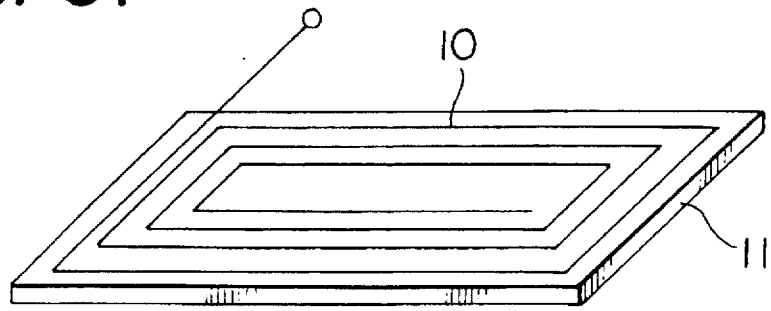
FIG. 31 shows the induction coil of the cathode-ray tube apparatus of the thirteenth embodiment of the present invention.

In the thirteenth embodiment of the present invention, the electric field cancellation electrode 6 is mounted so as to cover the horizontal deflection coil 8 in order to cancel the high frequency electric field radiated from the horizontal deflection coil 8 to the outside upon application of the pulse voltage e1. As shown in FIG. 27, if the electric field cancellation electrodes are mounted on the fringe outer peripheral portions of the horizontal deflection coil 8 both on the fluorescent surface 2a side aperture side and the electron gun side aperture side, the effects of reducing the electric field are great on the right and left sides of the deflection yoke 3. As shown in FIG. 28, if the electric field cancellation electrode 6 is mounted on the deflection yoke 3 covering the inner surface of the horizontal deflection coil 8, the effects of reducing the electric field are great on the front side of the deflection yoke 3. In this case, the electric field cancellation electrode 6 is made of a conductive wire so that an eddy current is hard to be generated by the horizontal deflection magnetic field. In addition, the electric field cancellation electrode 6 can be made thin allowing it to be mounted on the inner surface of the horizontal deflection coil 8. As shown in FIG. 29, if the electric field cancellation electrode 6 is made of a ring coil matching the shape of the fringe portion, the electric field reducing effects can be obtained similarly on the front side of the deflection yoke 3. As shown in FIGS. 30 and 31, if the electric field cancellation electrode 6 or induction coil 10 is made of a coil on a film insulator with a conductive pattern formed through printing or etching so as to mount it in tight contact with the inner surface of the deflection yoke 3, the electric field cancellation electrode or induction coil 10 can be made thin. Also in this case, like a conductive wire itself, an eddy current is hard to be generated.

Figure 32:
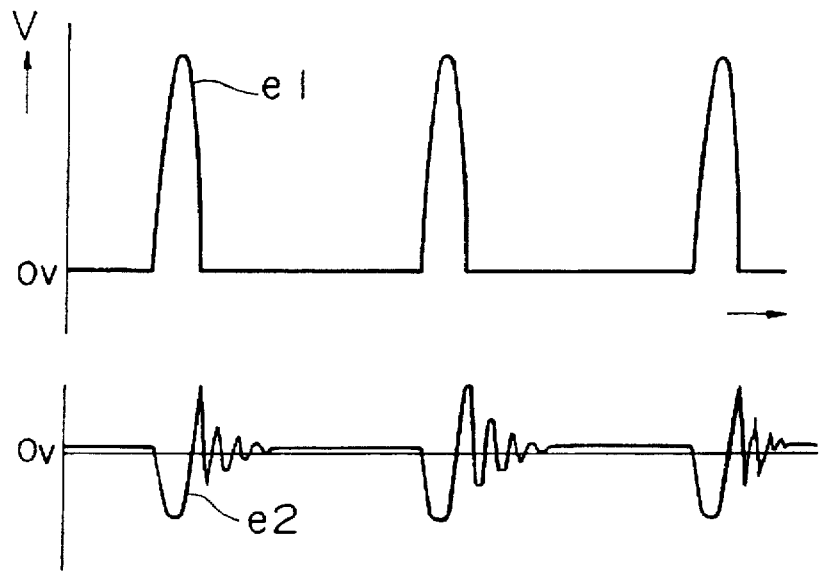
FIG. 32 shows voltage waveforms according to a fourteenth embodiment of the present invention.
Figure 33:
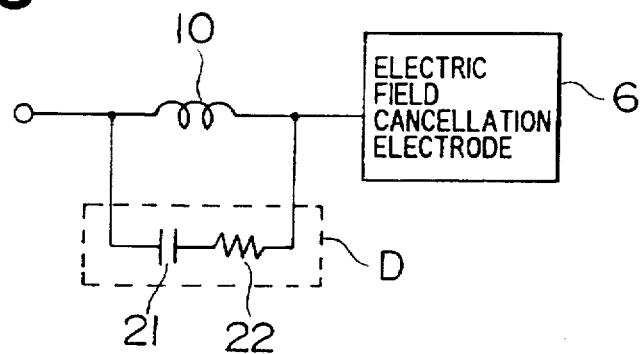
FIG. 33 is a diagram showing connections of the fourth embodiment of the present invention.

FIG. 32 shows the waveforms of the pulse voltage e1 applied to the horizontal deflection coil 8 and reverse pulse voltage e2 according to the fourteenth embodiment of the present invention. FIG. 33 is a connection diagram of the fourteenth embodiment. Reference numeral 21 represents a capacitor, and reference numeral 22 represents a resistor. The fourteenth embodiment of the present invention features in that high frequency ringing components contained in the reverse voltage e2 generated on the induction coil 10 are suppressed by connecting a damping element D in parallel with the induction coil 10.

In the fourteenth embodiment of the present invention, as shown in FIG. 32, in order to suppress the high frequency ringing components generated immediately after the falling of the reverse voltage e2, a serial circuit of the capacitor 21 and resistor 22 is connected in parallel with the induction coil 10 as shown in FIG. 33. The high frequency ringing components are likely to generate when the number of turns of the induction coil 10 is increased to obtain the reverse pulse voltage e2 of a large amplitude. Generation of such high frequency ringing components lowers the electric field reducing effects as compared with the waveform without ringing. The high frequency ringing components can be suppressed by this embodiment connecting the serial circuit of the capacitor 21 and resistor 22 to the induction coil 10 in parallel with it, thereby improving the electric field reducing effects.

In each of the above-described embodiments, a damping element such as a resistor may be connected to the terminal of the induction coil 10 opposite to the terminal connected to the electric field cancellation electrode 6. With this arrangement, the ringing components can be suppressed.

The following advantages (1) to (6) of the present invention having the structure described above can be obtained.

(1) An opposite polarity pulse voltage is applied to the electric field cancellation electrode provided to the cathode-ray tube apparatus to generate an electric field opposite in polarity to the high frequency electric field radiated from the deflection yoke and deflection and high voltage circuit to the outside of the cathode-ray tube apparatus. As a result, the high frequency electric field radiated outside of the cathode-ray tube apparatus can be reduced.

(2) With a relatively simple structure that a transformer connected to the horizontal deflection output or an induction coil interlinking the horizontal deflection magnetic field, it is possible to generate an opposite polarity pulse voltage necessary for reducing the high frequency electric field radiated outside of the cathode-ray tube apparatus.

(3) A reverse pulse voltage is applied to the electric field cancellation electrode provided to the deflection yoke to radiate an electric field opposite in polarity to the high frequency electric field radiated from the deflection yoke to the outside. As a result, the high frequency electric field can be canceled and reduced.

(4) Since the electric field cancellation electrode is made of a conductive wire, an eddy current to be generated by the horizontal deflection magnetic field can be reduced, suppressing its heat generation.

(5) The induction coil and electric field cancellation electrode may be formed continuously as an integrated component, improving the productivity.

(6) It is possible to provide a cathode-ray tube apparatus without adversely affecting other electronic apparatuses installed near the cathode-ray tube apparatus and without giving the condition injurious to health.

What is claimed is:

1. A deflection yoke to be mounted on a cathode-ray tube having at least a horizontal deflection coil and a cancellation coil series connected with said horizontal deflection coil, said deflection yoke for generating a horizontal deflection magnetic field upon an application of a high pulse voltage to the horizontal deflection coil, the deflection yoke comprising an electric field cancellation electrode mounted so as to at least partially cover the cancellation coil, the electric field cancellation electrode being made of a conductive wire or a conductive plate or a coil formed as a conductive pattern on a film insulator and the electric field cancellation electrode being connected to one end of an induction coil magnetically connected with a magnetic field generated by the cancellation coil.

* * * * *